March 26, 1963    W. H. BICKFORD    3,082,483
METHOD FOR PRODUCING A FLEXIBLE, RESILIENT LOW
DENSITY WEB OF CELLULAR PLASTIC
Filed Feb. 29, 1960
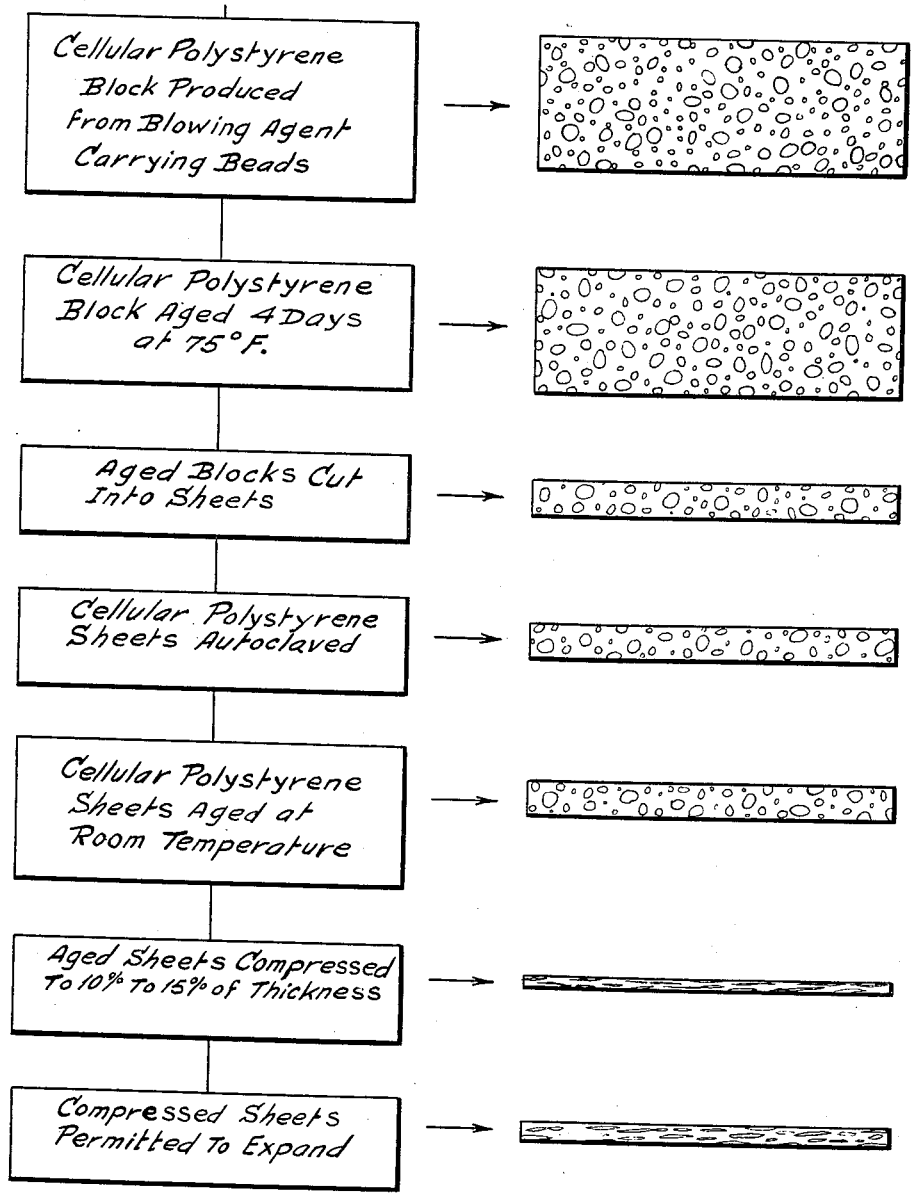
INVENTOR
WARREN H. BICKFORD
BY William R. Lieberman
ATTORNEY United States Patent Office 3,082,483
Patented Mar. 26, 1963

3,082,483
METHOD FOR PRODUCING A FLEXIBLE, RESILI-
ENT, LOW DENSITY WEB OF CELLULAR
PLASTIC
Warren H. Bickford, Norwich, Conn., assignor to The
Gilman Brothers Company, Gilman, Conn., a corpo-
ration of Connecticut
Filed Feb. 29, 1960, Ser. No. 11,448
5 Claims. (Cl. 18—48)

The present invention relates generally to an improved method for producing nonfibrous webs and it relates in particular to an improved method for producing low density synthetic, organic, thermoplastic webs having controllable characteristics of flexibility and resiliency, and to the resulting product.

The conventional low density foamed or cellular synthetic organic plastic materials, as typified by the foamed vinyl aromatic polymers such as polystyrene, are relatively rigid and lacking in resiliency. Although these materials are highly useful for thermal and sound insulation, their use in other fields, such as packaging and lining, has been limited by reason of the rigid nature thereof. Through use of a suitable plasticizing agent some of the rigid plastic foam materials may be rendered flexible and resilient to some extent but this expedient possesses numerous obvious drawbacks and disadvantages. In the case of the plastic foam materials not only is the cost thereof considerably increased, but also the mere presence of the plasticizer is undesirable and often dissipated, and its use otherwise leaves much to be desired.

It is thus a principal object of the present invention to provide an improved method of manufacturing a web of synthetic organic thermoplastic material.

Another object of the present invention is to provide an improved method for the production of synthetic organic thermoplastic webs.

Still another object of the present invention is to provide an improved method of producing a low density synthetic, organic thermoplastic web of controlled resiliency and flexibility.

A further object of the present invention is to provide an improved method of producing a low density polystyrene web which possess flexibility and resiliency to controlled degrees, and the resulting product.

Still a further object of the present invention is to provide an improved method, which is characterized by low cost and versatility.

The above and other objects of the present invention will become apparent from a reading of the following description taken in conjunction with the accompanying drawing which illustrates the steps for practicing the present process in accordance with a preferred form thereof.

There are many methods conventionally employed in the production of cellular synthetic organic thermoplastic materials such as foamed vinyl aromatic polymers; for example, foamed polystyrene, and these are usually characterized by the initial formation of a substantially homogeneous mixture of the thermoplastic resin and a blowing agent, generally an organic compound of low boiling point, such as petroleum ether, n-pentane, methyl chloride or the like. Upon heating the mixture to the melting or softening point of the plastic material, the blowing agent volatilizes under sufficient pressure thereby to foam the plastic material which, upon cooling and solidifying, is of a cellular nature.

A common method of producing polystyrene foam is by employing as a starting material high density beads of polystyrene admixed with a volatile organic blowing agent as above listed. The beads have a bulk density of about 38 to 40 pounds per cubic foot, a volatile content of between about 6.5% and 8.0% and are between about 20 and 30 mesh. Polystyrene beads of such type are marketed by Koppers Company, Dow Chemical Company and United Cork Company under the respective trademarks of "Dylite," "Pelaspan" and "Unicrest." The high density beads are first expanded by subjecting them to steam and their density decreased to about 0.75 to 1.00 pound per cubic foot. The expanded beads are then poured or blown into a large rectangular mold, and steam introduced thereinto which causes softening and swelling of the bead particles and a fusing thereof into a low density cellular mass. The foamed plastic block is then cooled, either by a water or air-dwell, to set the surface thereof and to permit its ready removal from the mold.

The block thus formed, in order to prepare it for the treatment according to present process, is then preferably stored in a relatively dry atmosphere at room temperature, between about 70° to 80° F., for at least two and up to four days. Such aging permits the complete cooling of the block and the development of its full strength; the water vapor carried by the block and that originating from the steam is replaced by air by the process of counter diffusion. The blocks, as aged above, are then sliced into sheets of the desired thickness, for example between ⅛" and 1".

It has been found that by compressing the cellular thermoplastic sheet to between 10% to 15% of its initial thickness and then relieving the pressure, a web of improved and highly desirable properties is achieved. Such web is highly flexible and resilient, and may be easily and readily embossed, decorated and cut by any conventional procedure.

It has further been found that by a heat pretreatment of the cellular thermoplastic sheet, prior to the compression or crushing thereof, a web of superior characteristics is realized in which the flexibility and resiliency thereof may be controlled. This heat treatment is effected by exposing the cellular thermoplastic sheet to steam at super-atmospheric pressure for a predetermined period of time and then allowing the sheet to age at room temperature for a predetermined interval immediately prior to the compression thereof. The shorter the aforesaid aging time the greater the flexibility and the longer the aging time the greater the resiliency of the final web. Such heating treatment and the subsequent aging of the cellular sheet produces, among other things, a cellular sheet at least part of which is at a temperature below the plastic softening point. Where the aging is of long duration all of the material is below the softening temperature and when of short duration a large portion of the sheet, particularly the interior thereof, is above the softening temperature.

The cellular polystyrene sheet is heat treated by placing it in a preheated autoclave, purging the autoclave of air and then introducing steam at about 12 to 15 lbs./sq., in. gauge pressure, and exposing the sheet to the steam for a period of from about 30 seconds to 60 seconds, the exposure time increasing with the sheet thickness. The pressure in the autoclave is then rapidly dropped to atmospheric pressure, the sheets remaining in the closed autoclave for about five minutes, after which the autoclave door is cracked and the sheets allowed to remain in the autoclave for an additional five minutes before removal. It is to be noted that further advantages are realized in this latter autoclaving. The size of the cells is increased, reducing the density of the foamed sheet and increasing its relative dimensions thereby to improve the economics of the process and reduce the cost of the end product. Where the thickness of the starting sheet exceeds 1", the steam treatment thereof may be facilitated by piercing the sheet with a pin cushion or spiked roll to expedite steam penetration thereinto. It is to be noted also that when compression ratios are given this refers to the original thickness of the cellular sheet prior to the last autoclaving step, and not following the expansion thereof in such autoclaving.

The thermoplastic low density web produced in the above manner may be further processed by embossing, employing either flat bed plates or rolls to impress geometric or other patterns or designs in the web. The web may also be perforated as part of the embossing operation, if desired, and it may otherwise be decorated and cut.

As an example of the present process in the production of an improved low density flexible polystyrene web the steps of which process are illustrated in the drawing, a cellular polystyrene block 9' by 4' by 16" in size having a density of about one pound per cubic foot is produced from the high density blowing agent-carrying polystyrene beads identified above in the manner described. The cellular polystyrene block is aged at room temperature, about 75° F., for about four days and is then cut along its width by means of a band saw or hot wire into sheets about ⅞" thick. The spaced sheets are then placed into the preheated autoclave and exposed to steam at 12 to 15 lbs./sq. in. gauge pressure for 60 seconds. The autoclave is then returned to atmospheric pressure and the door cracked after five minutes; the sheets being removed five minutes thereafter. The autoclaved sheets are then aged at room temperature in accordance with the degree of resiliency and flexibility desired. By aging the autoclaved sheets only one half hour prior to compression or crushing a high degree of flexibility and relatively low resiliency is achieved, whereas an aging period of one to two days results in a relatively high degree of resiliency and a reduced flexibility. Intermediate degrees of flexibility and resiliency are obtained by an aging interval between one and two hours. The aged cellular sheets are then compressed or crushed to 10% to 15% of their original thickness, for example 10%, by passing them between crush-rolls set or spaced apart 0.0875. The resulting web was about ½" thick. Thinner and thicker webs may be produced by employing thinner and thicker starting cellular sheets. Further, the density of the cellular sheets may be varied within certain limits, for, example, between 0.5 and 1.0 pound per cubic foot, although low density sheets of the above order are advantageously employed. It should be noted that a web possessing some resiliency may be produced merely by compressing or crushing the cellular sheet in the absence of autoclaving and that greater resiliency is achieved by employing the lower density sheets. Furthermore, a web having a fair degree of flexibility may be produced by compressing or crushing the cellular sheet before autoclaving.

The web produced in the above manner finds extensive use in the fields of packaging, insulation and cushioning. As a packaging material it may be employed as a wrap-around material for delicate or easily damaged articles; it may be die cut into pads for cushion packaging; it may be used as a box liner and may otherwise be so employed. Because of its thermal insulation and physical properties the improved web is ideally suited for use as wrap-around insulation for portable or odd shaped items, disposable insulation for shipment of perishables, low temperature pipe and duct insulation, roll type insulation for buildings, liners for portable tents, shelters and clothing and many other such uses. It also finds wide application in furniture cushioning, crash pads, carpet underlay and in other fields.

While there has been described a preferred embodiment of the present invention it is apparent that numerous alterations, omissions and additions may be made without departing from the spirit thereof.

What is claimed is:

1. The method of producing a flexible, resilient low density web of the character described comprising heating a relatively cool sheet of a low density cellular synthetic thermoplastic resin to raise at least a portion of said sheet substantially coextensive with the area thereof to a temperature of at least the softening point of said resin and below the fusion point of said sheet compressing said heated sheet to between 10% and 15% of its original thickness, and thereafter relieving said pressure and permitting said sheet to expand.

2. The method of producing a flexible, resilient, low density web of the character described comprising heating a relatively cool sheet of a low density cellular polystyrene to raise at least a portion of said sheet substantially coextensive with the area thereof to a temperature of at least the softening point of said polystyrene and below the fusion point of said sheet, compressing said heated sheet to between 10% and 15% of its original thickness, and thereafter relieving said pressure and permitting said sheet to expand.

3. The method of producing a flexible, resilient low density web of the character described comprising heating a relatively cool sheet of a low density cellular polystyrene to raise the temperature of substantially the full sheet to at least the temperature of the softening point of said polystyrene and below the fusion point of said sheet, cooling said sheet to lower the temperature of only a portion thereof substantially coextensive with the area of said sheet to below said softening point, compressing said partially cooled sheet to between 10% and 15% of its original thickness, and thereafter relieving said pressure and permitting said sheet to expand.

4. The method of producing a flexible, resilient low density web of the character described comprising subjecting to the action of superatmospheric steam, a sheet of of low density cellular polystyrene to raise the temperature of substantially the full sheet to at least the temperature of the softening point of said polystyrene and below the fusion point of said sheet, cooling said sheet to lower the temperature of only a portion thereof substantially coextensive with the area of said sheet to below said softening point, compressing said partially cooled sheet to a minor fraction of its original thickness, and thereafter relieving said pressure and permitting said sheet to expand.

5. The method of producing a flexible, resilient low density web of the character described comprising heating a relatively cool sheet of a low density cellular synthetic thermoplastic resin to raise at least a portion of said sheet substantially coextensive with the area thereof to a temperature of at least the softening point of said resin and below the fusion point of said sheet, thereafter compressing said sheet to a minor fraction of its original thickness, and thereafter relieving said pressure and permitting said sheet to expand.

References Cited in the file of this patent

UNITED STATES PATENTS

| | | |
|---|---|---|
| 2,538,406 | Allen | Jan. 16, 1951 |
| 2,575,259 | Cox et al. | Nov. 13, 1951 |
| 2,744,291 | Stastny et al. | May 8, 1956 |
| 2,813,053 | Tuomala | Nov. 12, 1957 |
| 2,899,708 | Donaldson et al. | Aug. 18, 1959 |
| 2,942,301 | Price et al. | June 28, 1960 |

FOREIGN PATENTS

| | | |
|---|---|---|
| 781,046 | Great Britain | Aug. 14, 1957 |

OTHER REFERENCES

Rubber World, Vinyl Foam, January 1959, pp. 542–549.